(12) United States Patent
Korytnikov

(10) Patent No.: US 8,302,421 B2
(45) Date of Patent: Nov. 6, 2012

(54) WEARABLE PERSONAL AIR CONDITIONING SYSTEM

(75) Inventor: Konstantin Korytnikov, Hollywood, FL (US)

(73) Assignee: EnerFuel, Inc., West Palm Beach, FL (US)

( * ) Notice: Subject to any disclaimer, the term of this patent is extended or adjusted under 35 U.S.C. 154(b) by 898 days.

(21) Appl. No.: 12/409,313

(22) Filed: Mar. 23, 2009

(65) Prior Publication Data

US 2010/0236267 A1    Sep. 23, 2010

(51) Int. Cl.
*F28D 5/00* (2006.01)
*F24F 3/14* (2006.01)

(52) U.S. Cl. .............. 62/314; 62/304; 62/91; 62/259.3; 165/60; 261/102; 261/104

(58) Field of Classification Search .............. 62/3.5, 62/91, 259.3, 304, 314, 293; 165/60; 261/102, 261/104; 128/200.24, 201.22–201.29, 202.11, 128/202.19; 2/457, DIG. 1, DIG. 3; 607/104, 607/108–112, 114
See application file for complete search history.

(56) References Cited

U.S. PATENT DOCUMENTS 5,168,722 A * 12/1992 Brock .............................. 62/304
7,380,774 B2 * 6/2008 Akita et al. .................... 261/104
* cited by examiner

*Primary Examiner* — Frantz Jules
*Assistant Examiner* — Cassey D Bauer
(74) *Attorney, Agent, or Firm* — Armstrong Teasdale LLP

(57) ABSTRACT

A personal air conditioning device cools and moistens environmentally hot and dry blower-forced air using water vaporization occurring on external surface of a hollow fiber microporous membrane while water or other liquid coolant is taken from a container by means of internal capillaries of hollow fiber tubes. The device is able to deliver the pre-cooled air flow over any desired body fragment, particularly under a protective vest.

18 Claims, 3 Drawing Sheets

WEARABLE PERSONAL AIR CONDITIONING SYSTEM

FIELD OF THE INVENTION

The present invention relates generally to a personal air conditioning device, and more particularly to an evaporative personal cooler utilizing a membrane arranged in a bundle of hollow tubes and permeable to a vaporized liquid.

BACKGROUND OF THE INVENTION

People subjected to extremely hot and dry environments for long periods are exposed to risks of body overheating and dehydration that can cause severe disorders or even death. There are several areas in which personnel must be equipped to endure such environmental conditions, for example, soldiers and guards deployed in desert climates, firefighters and steel production workers. Such individuals are supposed to wear heavy protective gear, accelerating body water loss unless the space underneath the gear, such as a vest is properly vented and cooled.

Presently, a prominent way to prevent heat buildup and resulting heavy body precipitation under a vest is the use of pre-cooled gel bags placed in special vest pockets. Such cooling technique depends on external refrigerator, can transfer body heat at uncontrolled rates and requires time for vest loading.

Some other cooling methods use water vaporization supplied into an air stream followed by heat withdrawal due to the latent energy absorption. Water mist devices can deliver water directly into an air flow created with a blower or fan. A water mist can be applied periodically to a skin or clothing making them wet. These methods can be limited to short-term relief and present water accumulation. To avoid direct water distribution in some cooling devices, it is disclosed in U.S. Pat. No. 6,189,327, for example, that blower-forced air is introduced to a body portion covered with a heat dissipating member having a liquid-retainable surface only on a side external relative to the body. However, a device operating in accordance with this principle provides the cooling effect only to body fragments, such as a neck or forehead, that is covered with the protective member.

SUMMARY OF THE INVENTION

An object of the present invention is to provide a personal wearable air conditioning system capable of delivering blower-forced air, pre-cooled by means of the vaporization of a liquid, over any desired body fragment, particularly under a protecting vest.

Another object of the invention is to provide a personal air conditioning system that can utilize replaceable moisture exchange cartridges which can use various cooling liquids.

Still another object of the invention is to provide a personal air conditioning system that can be arranged in a compact housing for carrying by the wearer in a pouch or pocket of such garments as belted waist packed, back packs or vests.

A personal air conditioning system in accordance with aspects of the present invention comprises, at least, a moisture exchange cartridge, a blower, and a reservoir to contain a liquid intended for cooling vaporization, such water, alcohols or their mixture. The moisture exchange cartridge has a bundle of capillary tubes extending from a first bundle end to a second bundle end. The bundle is arranged to provide interstitial space between and among outside surfaces of the tubes. The capillary tubes are constructed of a polymer permeable to a liquid coolant. A cartridge housing surrounds the bundle and provides an inlet for receiving air flow to the interstitial space and an outlet for exhausting the air flow. A sealant, such as epoxy, is preferably used to closing the interstitial space portion of the first end of the bundle while interiors of the tubes remain open at the first end for receiving a liquid coolant. At the second, opposite end, the tube interiors are closed, again by a sealant, such as epoxy, and the interstitial space surrounding the plugs tube ends can be left open and unsealed to provide an exhaust path for the air flow passing through the space between and among the capillary tubes.

The system further provides a liquid coolant reservoir operatively connected to the bundle first end for presenting a liquid coolant to the tube interiors at the first end and an air blower for supplying an air flow to the cartridge housing inlet. With this system, relatively dry and warm air flow forced by the blower through the interstitial space can be cooled and moistened by evaporation of a liquid coolant at the outside surfaces of the tubes and exhausted from the cartridge as a relatively cool and moist air flow for distribution to selected areas of the user's body, for example, under a vest in a torso region, or to a helmet or cooling collar.

The coolant fluid can be stored in a reservoir housed together with the cartridge or it can be held in a separate container, such as a water bottle, and fluidly connected to the cartridge enclosure through a tube. Similarly, the air blower and a replaceable power supply, such as a battery pack, can be housed with the cartridge or located apart and connected by an air tube. Preferably, the moisture exchange cartridge, the coolant reservoir, the air blower and the power supply are housed together in a compact device enclosure that is sized to fit conveniently in a pouch or pocket on the wearer, such as in a fanny pack, a back pack or on a vest.

The device enclosure is preferably equipped with a closeable opening for refilling the coolant reservoir, a closeable door for accessing the replaceable power supply and a removable cap for accessing the moisture exchange cartridge. To provide quick access to the features, particularly without removing from a storage pouch, the opening, the door and the cap are each accessible from a top of the device enclosure.

The cartridge can be replaceable and removably installed in a enclosure shell. The shell can provide an air intake opening for permitting the passage of air flow from the air blower to the cartridge inlet and an air outlet opening for permitting the release of air flow from the cartridge outlet to outside the device enclosure. The shell can also provide a coolant interface opening for permitting coolant access to the tube interiors at cartridge first end. This cartridge shell can be closed by a removable cap with the shell air outlet located on the cap. The air outlet can provide a rim or other interface for attaching a distribution tube or hose.

In addition to supplying forced air to the moisture exchange cartridge, a conduit provided within the device enclosure for routing air flow from the air blower to the cartridge shell intake can also provide a reservoir duct for routing airflow from the air blower to the coolant reservoir to pressurize the coolant reservoir.

The moisture exchange cartridge is preferably shaped as a cylindrical housing surrounding a cylindrically arranged tube bundle. The cartridge housing inlet can be formed as a series of two or more openings around the periphery of cartridge housing adjacent the first end. The cartridge housing outlet can be formed as an open top at the second end of the housing.

At the interface between the liquid coolant from the reservoir and the open ends of the capillary tubes, it is preferred to have a liquid coolant transport media, for example, a sponge material, contacting said bundle first end for absorbing liquid coolant from the coolant reservoir and presenting the liquid coolant to the bundle first end. The liquid coolant transport media has a lower capillarity than the capillary tubes to ensure the uptake of the liquid from the media material to the tube interiors. In this way, liquid coolant can be consistently supplied to the bundle first end even when liquid coolant levels in the coolant reservoir are low or fluctuate with movement.

The system according to aspects of the invention can be used in conjunction with a vest having a ventilation channel and holes facing the wearer's body and a distribution tube for routing air flow from the device enclosure to ventilation channel.

In operation, a liquid coolant is driven from the reservoir into the internal capillaries of the hollow tubes and further to the external surface of the hollow tubes across the membrane itself. A relatively hot and dry air flow is introduced by the blower under the housing of the cartridge through the air inlet and forced to move over the membrane through the interstitial spaces between the bundled tubes. The adsorption of latent heat required for the vaporization of the liquid occurring on the external surfaces of the hollow tube cools and humidifies the passing air which is discharged at the air outlet of the device. The mechanism for the transport a liquid through the membrane, particularly across the walls of the hollow tubes, depends on the nature of membrane material. Membranes made of a sulphonated fluoroethylene (PTFE) and well-known as a proton exchange membrane (PEM) are able to transfer only water due to highly hydrophilic properties of sulphonic acid groups. A membrane produced from synthetic micro-porous materials (for example, polysulfone) is permeable also for alcohol-based liquid (ethanol, isopropanol, and their aqueous solutions) to provide a cooling effect at a damp ambient condition when water is not useful. A synthetic membrane having an asymmetric structure with pores widening as they extend to the external surface of the hollow tubes can be more preferable for evaporation.

The blower of the air conditioning device is electrically powered with an internal replaceable battery unless a user is in possession of portable power supply, for example, a soldier wearable power system.

BRIEF DESCRIPTION OF THE DRAWINGS

Other advantages of the present invention will be readily appreciated as the same becomes better understood by reference to the following detailed description of preferred embodiments when considered in connection with the accompanying drawings wherein.

DETAILED DESCRIPTION OF PREFERRED EMBODIMENTS

Figure 1:
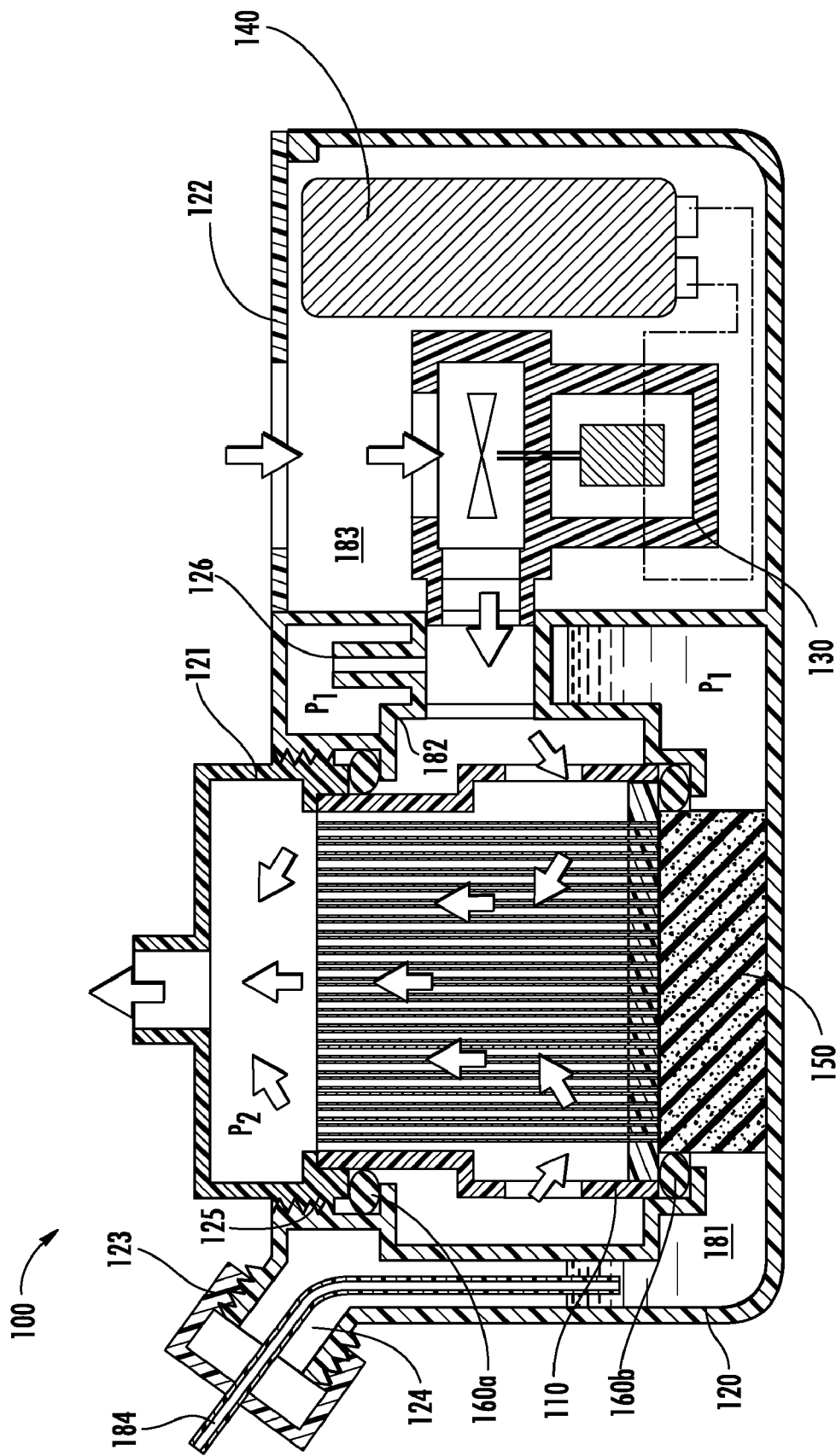
FIG. 1 is a cross-section view of a personal air conditioning device accommodating a tubular moisture exchange cartridge in accordance with preferred aspects of the invention.

Referring to the Figures, wherein like numerals indicate like or corresponding parts, an exemplary personal air conditioning device is shown in FIG. 1 and generally designated by the reference numeral 100. The personal air conditioning device 100 can include a tubular moisture exchange cartridge 110, a device enclosure 120, an air blower 130, a replaceable power supply 140, a water transferable media 150, preferably a porous sponge, inside a liquid coolant reservoir 181.

Figure 2:
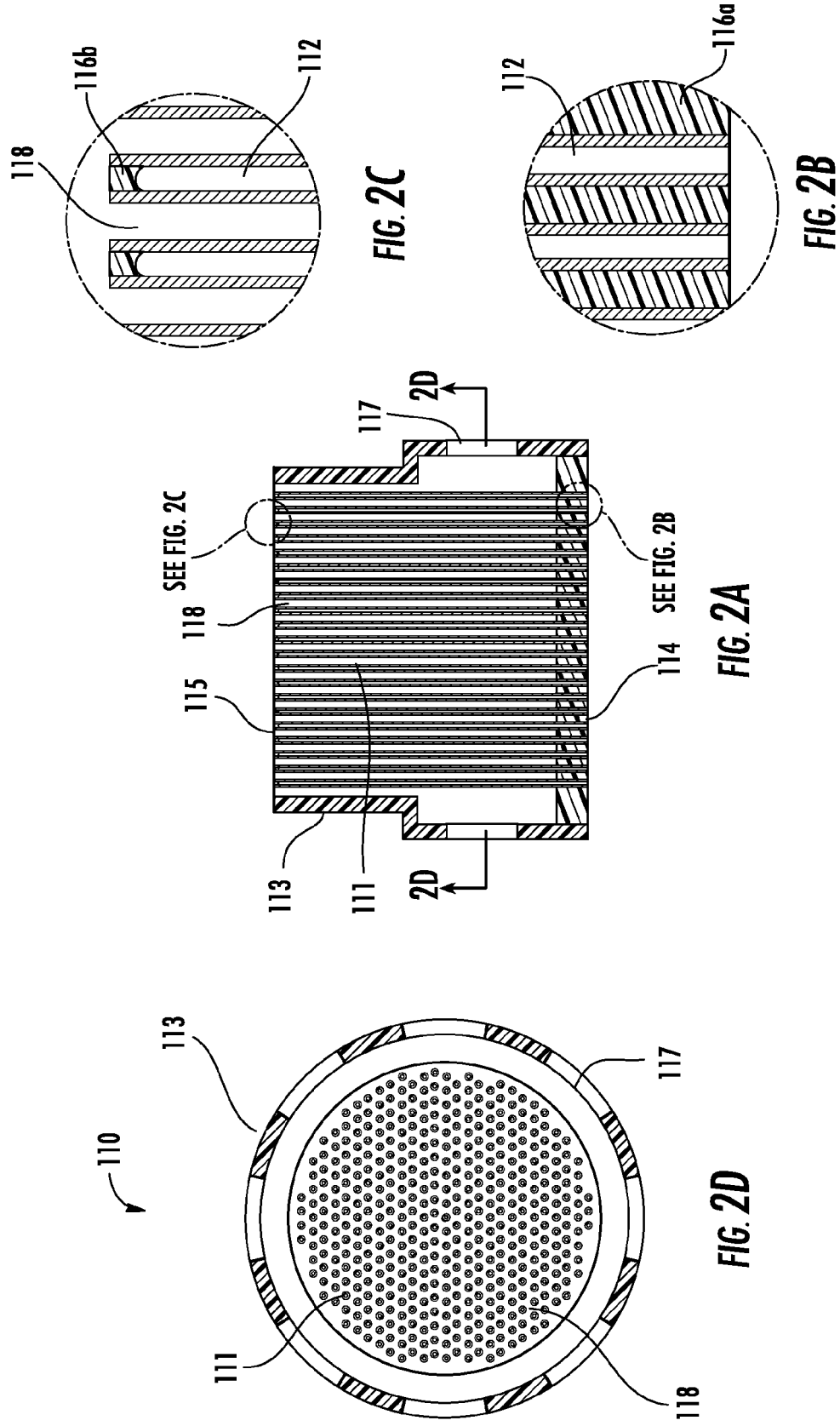
FIG. 2A is a cross-section view of the tubular moisture exchange cartridge.
FIG. 2B is a close up excerpt from FIG. 2A, showing the sealed intake end with open tubes.
FIG. 2C is a close up excerpt of FIG. 2B, showing the opening discharge end with closed tubes.
FIG. 2D is a section view along line A-A from FIG. 2A.

The tubular moisture exchange cartridge 110 as shown in FIGS. 2A-D, can include a bundle 111 of polymer membrane hollow capillary tubes 112 having micro-porous structure and a cartridge housing 113 accommodating the bundle 111. The capillary tubes 112 provide an interstitial space 118 between and among the capillary tubes 112. The cartridge housing 113 is preferably generally cylindrical. The bundle 111 at a first edge facing an intake side 114 of the tubular moisture exchange cartridge 110 can encapsulated with sealant 116a, preferably with an epoxy resin, but has internal capillaries of the hollow tubes 112 open. The sealant 116a can be applied using a centrifuge to control the extent of sealant penetration into the bundle length, preferably only deep enough to provide a closed end to the cartridge at the intake side 114, with temporarily clogged tubes. The clogged tube tips and adjacent sealant can then be cut away, leaving open tube ends and the remaining portion of the sealant closing the interstitial space portion of the intake end 114 as shown in FIG. 2B. At the other edge facing a distribution side 115 of the cartridge 110, the bundle 111 ends with the loose hollow tubes 112 having internal capillaries clogged with sealing media 116b, preferably with an epoxy resin. The housing 113 has openings 117 in proximity to the intake side 114 of the tubular moisture exchange cartridge 110.

The tubes 112 can form a collective membrane made of a material permeable to a liquid coolant, such as water and alcohol. The material can include sulphonated fluoroethylene (PTFE) well-known as a proton exchange membrane (PEM) able to transfer only water due to highly hydrophilic properties of sulphonic acid groups. A membrane produced from synthetic micro-porous materials (for example, polysulfone) is permeable also for alcohol-based liquid (ethanol, isopropanol, and their aqueous solutions) to provide a cooling effect at a damp ambient condition when water is not useful. A synthetic membrane having an asymmetric structure with pores widening as they extend to the external surface of the hollow tubes can be more preferable for evaporation. Water permeable membranes can also be used in survival applications, in which salt water or even urine may be used as a coolant, subject to more frequent replacement of the moisture exchange cartridges.

Referring again, to FIG. 1, the device enclosure 120 can have a cap 123 hermetically covering a water refilling opening 124, a cartridge cover 121 hermetically adjusted to the distribution side 115 of the tubular moisture exchange cartridge 110 by means of an o-ring 160a and a thread 125 and a utility cover 122 allowing an assess to a replaceable power supply 140. Internal configuration of the device enclosure 120 divides its interior into the liquid reservoir 181, a shell 182 accommodating the tubular moisture exchange cartridge 110 and a compartment 183 housing the air blower 130 and the replaceable power supply 140. A top of the liquid reservoir 181 is in fluid communication with an outlet of the blower by means of a duct 126 to pressurize the liquid reservoir 181. A perimeter of the intake side 114 of the tubular moisture exchange cartridge 110 inserted in the shell 182 is sealed by means of the o-ring 160b as the cartridge cover 121 is tightly screwed into the device enclosure 120 through the thread 125, pressing the moisture exchange cartridge 110 into sealing engagement with the o-ring 160b. The cover 121 is also sealed with the shell 182 by the tightening of the cover 121.

The use of a liquid reservoir 181 pressurized by the air blower 183 through a duct 126 or similar air supply can provide an additional advantage of providing a pressure assisted drinking source from the reservoir 181. A drinking tube 184 can optionally be installed through the refilling opening 124 of device enclosure 120 and routed, for example, from a waist area location of the device to an area near the user's mouth. The reservoir 181 can hold potable water. Because the liquid reservoir 181 is under pressure (e.g. about 40 cm of water), the drinkable water is elevated along the tubing 184 extending to the user's mouth area. With a relatively small suction effort, the user can drink directly from the liquid reservoir 181. The cooling device 110 can simultaneously serve as a source of drinkable water delivering water on demand with no user hand involvement.

In operation, a liquid intended for vaporization is taken by means of mainly a strong capillary action of the capillary tubes, and consequently, from the liquid reservoir 181 and the liquid transport media 150 (sandwiched between the bottom of the liquid reservoir 181 and the intake end 114 of the moisture exchange cartridge 110). The liquid transport media 150 is preferably a sponge material, but in any event is selected to have less capillarity than the capillary tubes 112. The use of the liquid transport media 150 helps to insure a prolonged supply of liquid coolant o the intake side of the cartridge 110 even as fluid levels in the reservoir 181 drop or change due to movement of the user. From the reservoir 181 with or without the liquid transport media 150, the liquid coolant is drawn into the dead-ended internal capillaries of the hollow tubes 112 and, further, to openings of pores on external surface of the hollow tubes 112 (see FIG. 2C). The blower 130, powered with the replaceable power supply 140, delivers relatively hot and dry air into the shell 182 and, then, into the cartridge housing 113 of the tubular moisture exchange cartridge 110 through the openings 117. The air is cooled while flowing within the moisture exchange cartridge 110 through the interstitial space between and among the outer surfaces of the tubes 112 towards the a distribution side 115 due to the adsorption of latent heat required for the liquid evaporation occurring on openings of pores on the hollow fiber external surfaces.

The liquid reservoir 181 can also be under pressure developed by the blower 130, supplied through the duct 126. As result, a pressure gradient $P_2$-$P_1$ is created between the intake end 114 and the air distribution end 115 of the moisture exchange cartridge 110, more particularly, between the internal capillaries of the hollow tubes 112 and the housing 113 of the tubular moisture exchange cartridge 110, in order, first, to enhance liquid transport for a vaporization, and second, to prevent a gasification of internal capillaries of the hollow tubes 112 with the air delivered under the housing 113 by the blower 130.

A liquid coolant refilling of the personal air conditioning device 100 is provided through the liquid refilling opening 124 while the cap 123 of the device enclosure 120 is open. An exchange of the replaceable power supply 140 is accomplished while the utility cover 122 is open. An exchange of the tubular moisture exchange cartridge 110 is performed by means of unscrewing the cartridge cover 121 being replaced from the shell 182 of the device enclosure 120.

Figure 3:
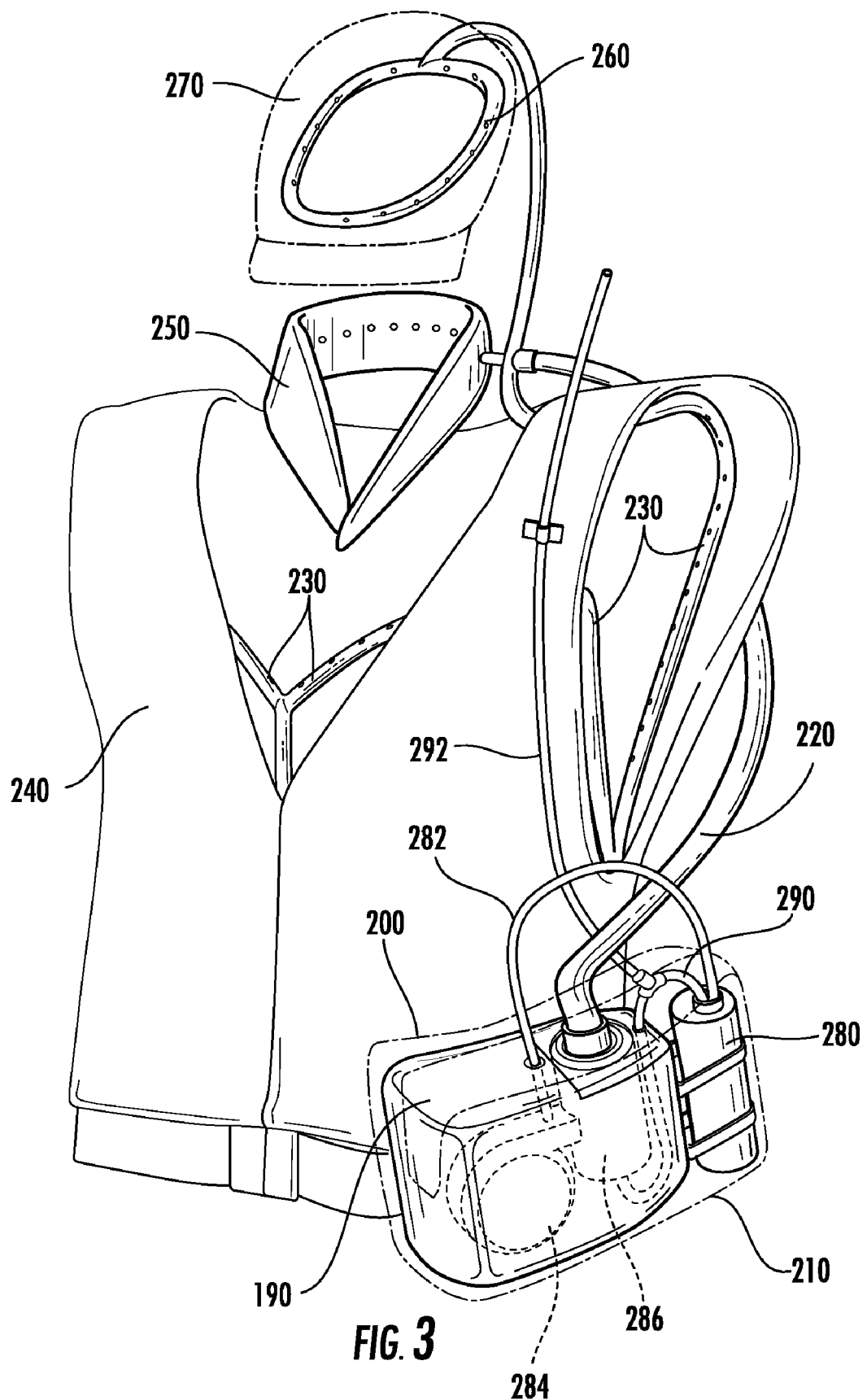
FIG. 3 is a perspective view of a wearable personal air conditioning device equipped in a wearable pouch and supplying to a vest, collar and helmet.

As shown in FIG. 3, an air conditioning device 190 is preferably configured to be wearable. The device 190 can be stored in a pouch 200 of a garment, such as belted waist pack 210—sometimes referred to as a fanny pack. A distribution tube 220 can be provided to route cooled air from the device 190 to ventilation channels 230 in a vest 240 for cooling a torso, a ventilated collar 250 for cooling a neck region or a ventilation ring 260 for cooling a head region under a hat or helmet 270.

The device 190 is constructed similarly to the device 100 as shown in FIG. 1. However, as an alternative, the liquid coolant reservoir can be provided in a separate container 280. The separate container 280 is pressured, for example, through a pressure tube 282 supplying air from the blower 284. The pressurized separate container 280 supplies coolant directly to the moisture exchange cartridge 286 through a tube 290, which can also provide a drinking tube branch 292 that can be secured to the vest 240 and provide a source of water at shoulder level that is pressure assisted for easier drinking.

Although various examples and preferences for implementing aspects of the invention have been described with varying degrees of detail in this disclosure, such details are not intended to limit the scope of the invention. Rather, it is intended that the legal scope of protection for the various aspects of the invention should be determined by the following claims.

What is claimed is:

1. A wearable personal air conditioning system comprising:
    a moisture exchange cartridge having a bundle of capillary tubes extending from a first bundle end to a second bundle end, said bundle being arranged to provide interstitial space between and among outside surfaces of the tubes, said capillary tubes being constructed of a polymer permeable to a liquid coolant, and a cartridge housing accommodating said bundle, said cartridge housing having an inlet for receiving air flow to the interstitial space and an outlet for exhausting the air flow;
    a sealant closing the interstitial space portion of the first end of the bundle while interiors of the tubes remain open at the first end for receiving a liquid coolant, the tube interiors being closed at the second end;
    a liquid coolant reservoir operatively connected to the bundle first end for presenting a liquid coolant to the tube interiors at the first end; and
    an air blower for supplying an air flow to the cartridge housing inlet, whereby relatively dry and warm air flow through the interstitial space can be cooled and moistened by evaporation of a liquid coolant at the outside surfaces of the tubes and exhausted from the cartridge as a relatively cool and moist air flow.

2. The system according to claim 1, further comprising a device enclosure having a shell for removably receiving the cartridge, said shell having an air intake opening for permitting the passage of air flow from the air blower to the cartridge housing inlet and an air outlet opening for permitting the release of air flow from the cartridge housing outlet to outside the device enclosure and a coolant interface opening for permitting coolant access to the tube interiors at the cartridge housing first end.

3. The system according to claim 2, wherein the cartridge housing is closed by a removable cap and the shell air outlet is located on the cap.

4. The system according to claim 2, further comprising a distribution tube connected to the shell air outlet for supplying air flow from the shell air outlet to a selected area on the wearer.

5. The system according to claim 2, wherein the device enclosure further encloses the coolant fluid reservoir.

6. The system according to claim 2, further including a replaceable power supply and wherein the device enclosure further encloses the air blower and the replaceable power supply.

7. The system according to claim 2, further including a replaceable power supply and wherein the device enclosure further encloses the coolant fluid reservoir, the air blower and the replaceable power supply.

8. The system according to claim 7, further comprising a closeable opening for refilling the coolant reservoir, a closeable door for accessing the replaceable power supply and a removable cap for accessing the moisture exchange cartridge wherein the closable opening, the door and the cap are each accessible from a top of the device enclosure.

9. The system according to claim 7, wherein a conduit is provided within the device enclosure for routing air flow from the air blower to the cartridge housing intake, said conduit further providing a reservoir duct for routing airflow from the air blower to the coolant reservoir to pressurize the coolant reservoir.

10. The system according to claim 2, wherein the cartridge housing is cylindrical.

11. The system according to claim 10, wherein the cartridge housing inlet is formed as at least two openings around the periphery of the cartridge housing adjacent the first end of the cartridge housing and the cartridge housing outlet is an opening at a second end of the cartridge housing.

12. The system according to claim 2, wherein the coolant reservoir includes a separate container outside the device enclosure and a tube from the separate container to the device enclosure for supplying liquid coolant from the separate container to the device enclosure.

13. The system according to claim 2, further comprising a liquid coolant transport media contacting said bundle first end for absorbing liquid coolant from the coolant reservoir and presenting the liquid coolant to the bundle first end, whereby liquid coolant can be consistently supplied to the bundle first end even when liquid coolant levels in the coolant reservoir are low or fluctuate with movement.

14. The system according to claim 2, further comprising a garment having a pouch holding the device enclosure.

15. The system according to claim 14, wherein the garment is one of a belted waist pack, a back pack, and a vest.

16. The system according to claim 2, further comprising a vest having a ventilation channel and holes for directing cooled humidified air to a wearer's body and a distribution tube for routing air flow from the device enclosure to ventilation channel.

17. The system according to claim 2, wherein the polymer is permeable to one of water, alcohol, a mixture of water and alcohol and water containing liquids.

18. A moisture exchange cartridge for use in a wearable personal air conditioning system, said cartridge comprising a bundle of capillary tubes extending from a first bundle end to a second bundle end, said bundle being arranged to provide interstitial space between and among outside surfaces of the tubes, said capillary tubes being constructed of a polymer permeable to a liquid coolant, and a cartridge housing accommodating said bundle, said cartridge housing having an inlet for receiving air flow to the interstitial space and an outlet for exhausting the air flow; and a sealant closing the interstitial space portion of the first end of the bundle while interiors of the tubes remain open at the first end for receiving a liquid coolant, the tube interiors being closed at the second end.

* * * * *